US006876659B2

(12) United States Patent
Aznar et al.

(10) Patent No.: US 6,876,659 B2
(45) Date of Patent: Apr. 5, 2005

(54) ENQUEUING APPARATUS FOR ASYNCHRONOUS TRANSFER MODE (ATM) VIRTUAL CIRCUIT MERGING

(75) Inventors: Ange Aznar, La Colle-sur-Loud (FR); Jose Iruella, St Laurent du Var (FR); Daniel Orsatti, La Gaude (FR); Bruno Rene Rousseau, Vence (FR)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 09/753,920

(22) Filed: Jan. 3, 2001

(65) Prior Publication Data

US 2001/0007561 A1 Jul. 12, 2001

(30) Foreign Application Priority Data

Jan. 6, 2000 (EP) .............................................. 00480011

(51) Int. Cl.[7] .............................................. H04L 12/56
(52) U.S. Cl. ..................... 370/395.1; 370/412; 370/428; 370/537
(58) Field of Search ................................. 370/412, 468, 370/395.4, 395.41, 395.42, 395.43, 235, 389, 395.1, 395.21, 395.5, 395.52, 413, 428, 429, 434, 537

(56) References Cited

U.S. PATENT DOCUMENTS

| | | | | | |
|---|---|---|---|---|---|
| 5,533,020 A | * | 7/1996 | Byrn et al. | ............... | 370/395.4 |
| 5,818,841 A | * | 10/1998 | Shen | ...................... | 370/395.21 |
| 5,848,068 A | * | 12/1998 | Daniel et al. | ........... | 370/395.43 |
| 5,999,533 A | * | 12/1999 | Peres et al. | .............. | 370/395.4 |
| 6,069,893 A | * | 5/2000 | Parruck et al. | ........ | 370/395.42 |
| 6,185,209 B1 | * | 2/2001 | Wicklund | .............. | 370/395.71 |
| 6,233,243 B1 | * | 5/2001 | Ganmukhi et al. | ......... | 370/412 |
| 6,510,158 B1 | * | 1/2003 | Robotham et al. | .......... | 370/399 |

FOREIGN PATENT DOCUMENTS

| | | | | | |
|---|---|---|---|---|---|
| EP | | 1011291 A2 | * | 6/2000 | ........... H04Q/11/04 |

* cited by examiner

Primary Examiner—Chi Pham
Assistant Examiner—Anh-Vu H Ly
(74) Attorney, Agent, or Firm—Daniel E. McConnell; Dillon & Yudell LLP

(57) ABSTRACT

A system and method for merging multiple connections that share a same class of service into a single virtual circuit (VC) in an Asynchronous Transfer Mode (ATM) network. A queuing apparatus includes multiple connection queues for each of the connections, and further includes a scheduled queue corresponding to a particular class of service, wherein contents of the connection queues are transferred into the scheduled queue before being transmitted on the VC. A reassembly queue control block (RQCB) defines a chain of buffer control blocks for the connection queues. Each buffer control block corresponds to a cell belonging to a packet of a particular connection and includes a next buffer address and a lock bit. The chain of buffer control blocks is transferred to a scheduled queue control block (SQCB) in response the lock bit indicating a last packet cell.

12 Claims, 5 Drawing Sheets

ENQUEUING APPARATUS FOR ASYNCHRONOUS TRANSFER MODE (ATM) VIRTUAL CIRCUIT MERGING

BACKGROUND OF THE INVENTION

1. Technical Field

The invention relates in general to merging connections having the same destination in a switching node in an Asynchronous Transfer Mode (ATM) network into a single virtual circuit (VC), and in particular to an enqueuing system for providing VC merged connections in a router of an ATM network.

2. Description of the Related Art

The use of ATM switching nodes in an Internet Protocol (IP) network is now an attractive approach since ATM hardware switches have been extensively studied and are widely available in many different architectures. In an ATM switching mechanism, the implementation of label swapping requires linking routers by virtual paths (VP)/virtual circuits (VC).

Traditionally, ATM Adaptation Layer 5 (AAL 5) has been used as the encapsulation method in data communication since it is simple, efficient, and includes a powerful error detection mechanism. For an ATM switch to forward incoming cells to correct outputs, IP route information must be mapped into ATM labels that are maintained within Virtual Path (VP) and/or Virtual Channel (VC) fields of ATM cells.

Several methods of mapping IP route information to ATM labels exist. In the simplest form, each source destination pair is mapped to a unique VC value at a switch. This method, called the non-VC merging case, allows the receiver to easily reassemble cells into respective packets since the VC values can be used to distinguish the senders. However, if there are n sources and m destinations, each switch is potentially required to manage n×m VC labels for full-meshed connectivity. Therefore, this method is not scalable to large networks.

In the second method, called VP merging, the VP labels of cells that are intended for the same destination are translated to the same outgoing VP value, thereby reducing VP consumption downstream. For each VP, the VC value is used to identify the sender so that the receiver can reconstruct packets even though cells from different packets are allowed to interleave. Although the number of label entries is considerably reduced, VP merging is not practical insofar as the VP space is limited (4.096 entries) at the network-to-network interface.

A third method, called VC merging, maps incoming VC labels for the same destination to the same outgoing VC label. This method is scalable and does not have the space constraint problem as in VP merging. With VC merging, cells for the same destination are indistinguishable at the output of a switch. Therefore, cells belonging to different packets for the same destination must not interleave with each other, or else the receiver will not be able to reassemble the packets. With VC merging, the boundary between two adjacent packets are identified by the "End-of-Packet" (EOP) marker used by AAL 5.

If VC merging is implemented, each output adapter of a switching node must contain a number of reassembly buffers, followed by a merging unit and an output buffer. Each reassembly buffer corresponds to an incoming VC value. The purpose of the reassembly buffer is to ensure that cells for a given packet do not interleave with other cells that are merged to the same VC. This mechanism (called store-and-forward at the packet level) can be accomplished by storing each incoming cell for a given packet in the reassembly buffer until the last cell of the packet arrives. When the last cell arrives, all cells in the packet are transferred in an atomic manner to the output buffer for transmission to the next hop. To be efficient, such a process must be performed as quickly as possible. Furthermore, if the traffic is composed of a single class of service (for example best-effort) there is no problem. However, if the traffic is composed of multiple classes of services, only a partial merging is implemented wherein only VCs destined for the same class are mapped to the same outgoing VC.

SUMMARY OF THE INVENTION

A system and method for merging multiple connections that share a same class of service into a single virtual circuit (VC) connecting a first switching node to a second switching node in an Asynchronous Transfer Mode (ATM) network are disclose herein. In accordance with the system of the present invention, a data buffer stores cells that constitute a packet received by a switching node. A queuing apparatus includes multiple connection queues associated respectively with each of the connections, and further includes a scheduled queue corresponding to a particular class of service, wherein contents of the connection queues are transferred into the scheduled queue before being transmitted on the VC. A reassembly queue control block (RQCB) is associated with each of the connection queues, and defines a chain of buffer control blocks. Each buffer control block corresponds to a cell belonging to a packet transmitted in a particular connection. Each buffer control block also includes a next buffer address in the data buffer and a lock bit that is normally set to 1 for an incoming cell and is set to 0 for an incoming cell only if the incoming cell is a last cell of the packet. A scheduled queue control block (SQCB) is associated with the scheduled queue to which the chain of buffer control blocks is transferred in response to a determination that the lock bit of a cell stored within the data buffer is set to 0. A corresponding buffer control block is chained to the chain of buffer control blocks in the SQCB without having been previously queued in the RQCB.

All objects, features, and advantages of the present invention will become apparent in the following detailed written description.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE PREFERRED EMBODIMENT

Figure 1:
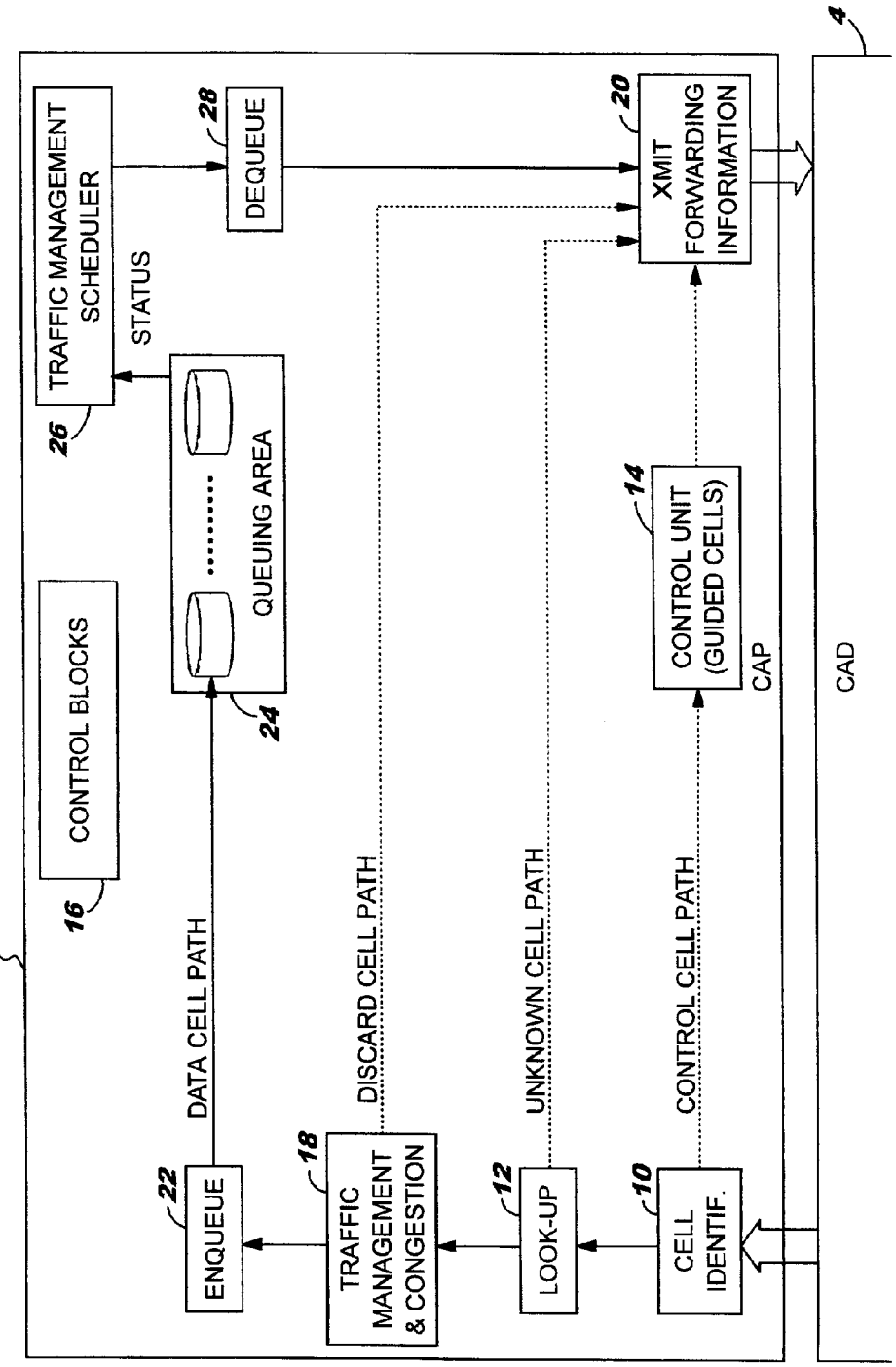
FIG. 1 is a block diagram illustrating a protocol engine of an output adapter in an ATM switching node in which the enqueueing system of the present invention is implemented.

With reference now to the figures, and in particular with reference to FIG. 1 there is depicted a block diagram illustrating a protocol engine of an output adapter in an ATM switching node in which the enqueueing system of the present invention is implemented. Specifically, the description in reference to FIG. 1 relates to the structure of a Common ATM Processor (CAP) 2 in an output adapter that includes the enqueueing system of the present invention. Upon receipt of a cell from a Common ATM Data Mover (CAD) 4, a cell identification unit 10, here an ATM label decoder, determines whether the cell is an ATM user cell or a control cell from a Control Point. If cell identification unit 10 determines the cell is an ATM user cell, it and delivers the cell to a lookup unit 12. Otherwise cell identification unit 10 forwards the cell to a control unit 14.

Lookup unit 12 resolves the ATM label (VP-VC) of the incoming cell to identify its connection using a set of control blocks 16 that are set by the Control Point. If lookup unit 12 determines that the cell belongs to a known connection, the cell is delivered to a traffic management and congestion unit 18. If not, the cell is sent to a Xmit forwarding information unit 20 for discarding.

Traffic management and congestion unit 18 classifies the cell according to its class of service as determined by control information found in control blocks 16 and also in accordance with the congestion level found in the target queue. This process also performs the admission control. If the permissible target queue congestion level is not currently exceeded and if the network flow control policy parameters are not violated, the cell is forwarded to an enqueue unit 22. Otherwise the cell is delivered to Xmit forwarding information unit 20 for discarding.

Enqueue unit 22 utilizes the cell address pointer to enqueues the cell in the appropriate queue of a queuing area 24. It should be noted that queuing area 24, which in a preferred embodiment contains the enqueueing apparatus of the invention, holds the cell buffer address pointers that have been queued until a dequeue occurs.

A traffic management scheduler 26 selects the queue from which a cell is to be transmitted in accordance with the queue priorities (different queues provide different qualities of service). The identity of the selected queue is then sent to a dequeue unit 28. Scheduler 26 is activated by a status indicator provided by queuing area 24 (indicating at least one cell in the queue).

Dequeue unit 28 dequeues a cell from the selected scheduled queue, and also provides the forwarding information found in control blocks 16 (destination port, label out). The cell is then delivered to Xmit forwarding information unit 20 which feeds cells to CAD module 4 for transmission or discarding.

Control unit 14, containing guided cells, performs all the actions requested by the Control Point, including read or write operations from or to control blocks 16 and hardware registers. Guided cells that are used for reading are the "guided read cells" (GRC) while the guided cells which are used for writing are "guided write cells" (GWC).

It should be noted that control blocks 16 reside in the memory storage of CAP module 2 (external or internal), and contain different types of control blocks such as lookup resolution tables, connection parameters, queue parameters, etc. Control blocks 1 are set and updated by the GWCs from control unit 14, but the different processing units of CAP module 2 can also update control blocks 16.

Figure 2:
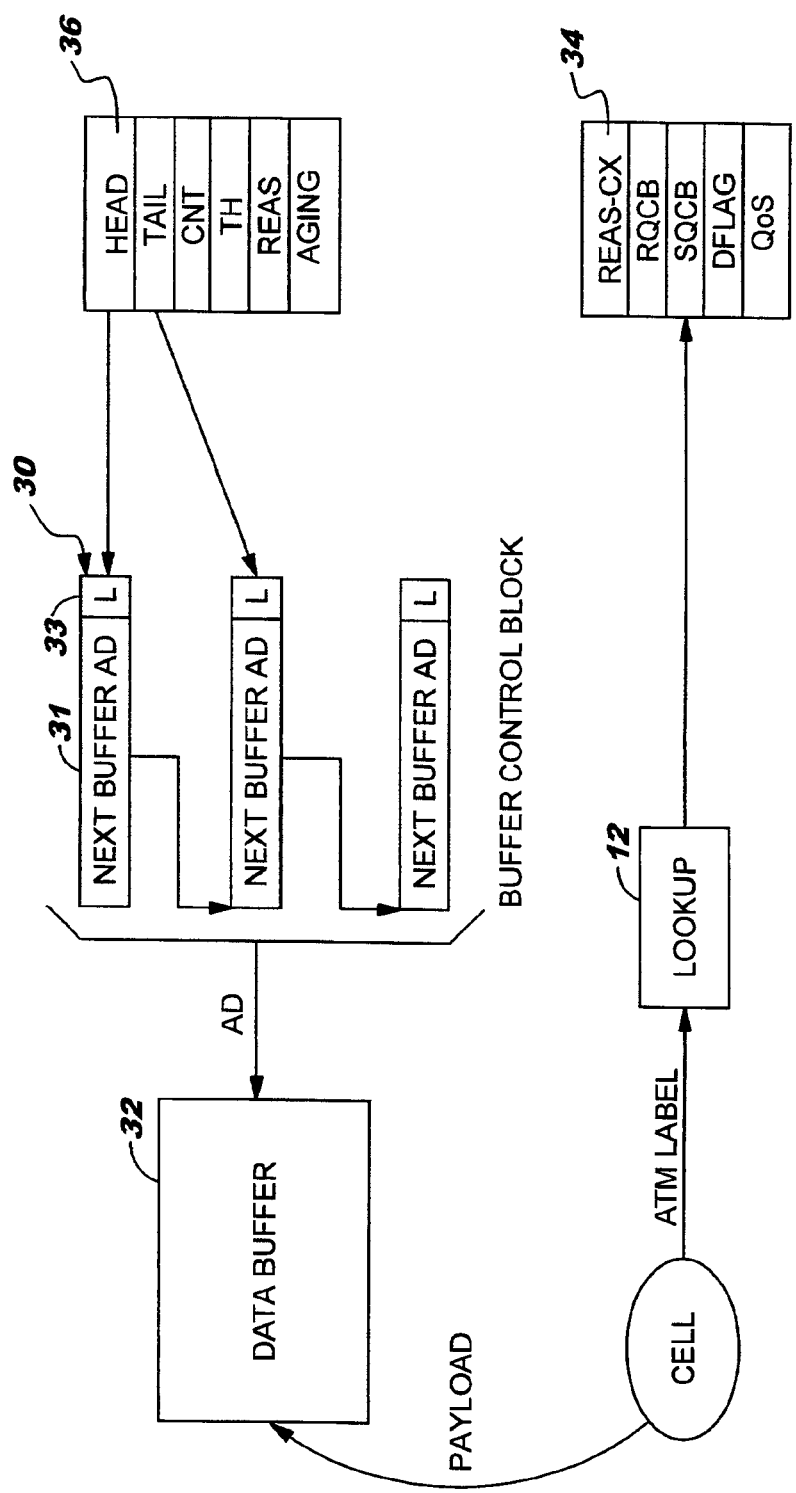
FIG. 2 is a schematic block diagram depicting the data flow of an ATM cell using control blocks in accordance with a preferred embodiment of the present invention.

Turning now to FIG. 2, there is illustrated a schematic block diagram depicting the data flow of an ATM cell using control blocks (as embodied by control blocks 16) in accordance with a preferred embodiment of the present invention. Specifically, the preferred embodiment illustrated in FIG. 2 shows the control block structure as embodied by control blocks 16 in combination with the cell data flow. First, a plurality of buffer control blocks (BCB) 30 are utilized to store pointers to the addresses of cells that are stored in a data buffer 32. Each BCB includes two fields, a next buffer address field 31 and a lock bit 33. The contents of buffer address field 31 are utilized to chain the BCBs to form cell queues. Lock bit L 33 is set to 0 only if the object cell is the last cell of a packet, and is otherwise set to 1. For each cell, only the cell payload is stored in data buffer 32 while the ATM label is resolved by the lookup unit 12.

The output of lookup unit 12 is a pointer to a Connection Control Block (CCB) 34 which contains the following fields. First, a REAS-CX bit indicates whether or not the reassembly of cells for VC merging is currently active for the connection. An address of a Reassembly Queue Control Block (RQCB) is utilized to assemble the packets of the connection when the reassembly of cells for VC merging is active. An address of a Scheduled Queue Control Block (SQCB) is assigned to a specific class of service. A discard flag bit DFLAG provides an indication of whether or not the object packet in progress is being discarded. Finally, a Quality of Service (QoS) field is utilized by traffic management and congestion unit 18 in performing its tasks as described with reference to FIG. 1.

The enqueueing system of FIG. 2 further includes queue control blocks 36 that, in a preferred embodiment may be Reassembly Queue Control Blocks (RQCBs) which are each utilized for queuing BCBs of the different connections to be VC merged. Also in a preferred embodiment queue control blocks can be Scheduled Queuing Control Blocks (SQCBs) that are each utilized for queuing BCBs from RQCBs belonging to packets of a same class of service.

A queue control block contains the following fields. First, a HEAD field points to the BCB of the first cell of a queue corresponding to a same packet. A TAIL field points to the BCB of the last cell of a queue corresponding to a same packet. A CNT field indicates the number of cells in the queue. A TH field provides an indication of either the threshold or maximum allowable size of a reassemble packet in case of RQCB. For a SQCB the TH field indicates the threshold processing capacity of traffic management and congestion unit 18. A reassembly bit REAS indicates whether the queue corresponds to a RQCB or to a SQCB. Finally, an aging bit AGING is set if the queue corresponds to RQCB.

Figure 3:
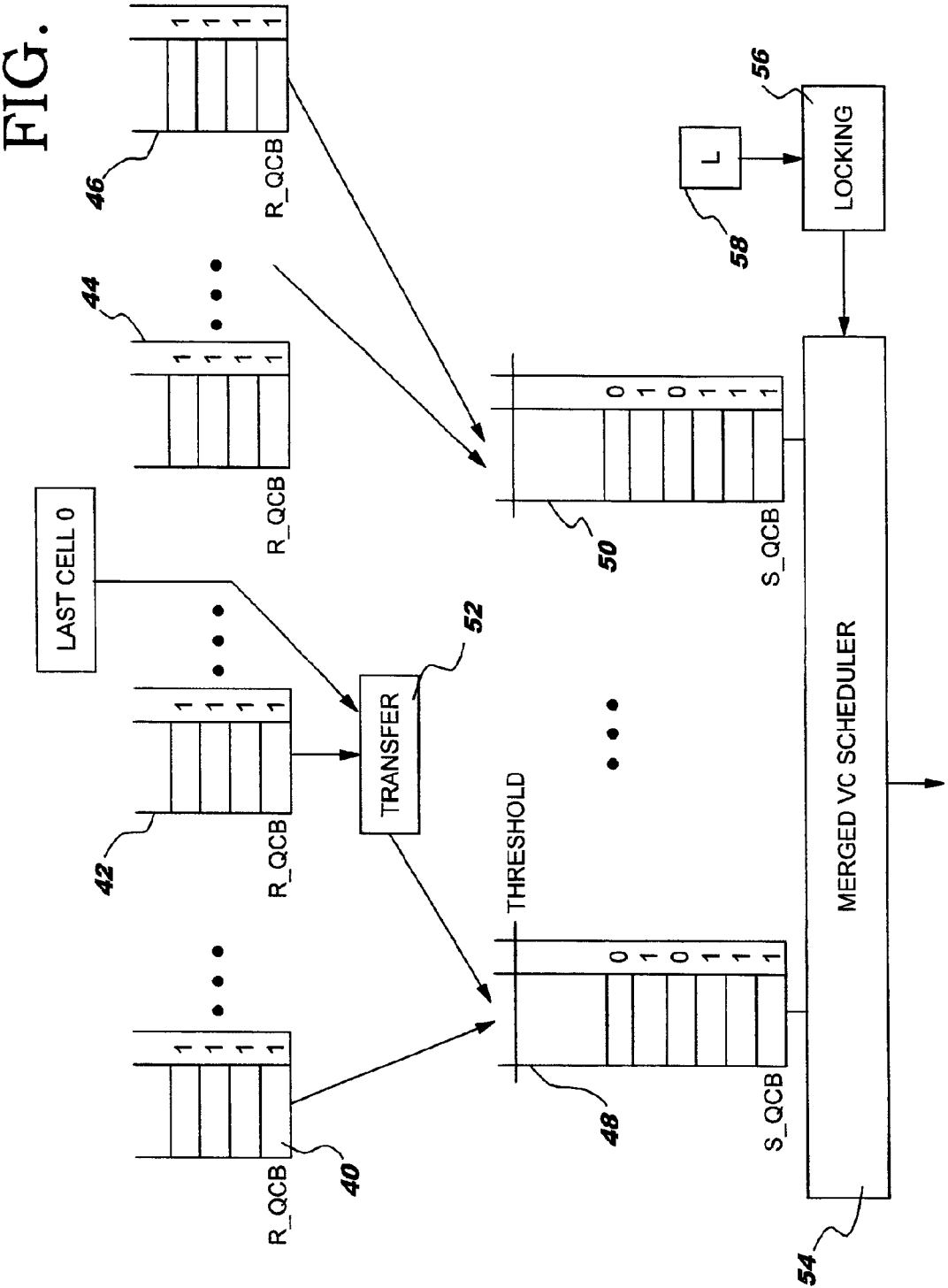
FIG. 3 is a schematic block diagram illustrating the data flow of ATM cells in a queuing area utilizing reassembly queue control blocks and scheduled queue control blocks depicted in FIG. 2.

With reference now to FIG. 3 there is depicted a schematic block diagram illustrating the data flow of ATM cells in a queuing area utilizing RQCBs and SQCBs as embodied by queue control blocks 36 in FIG. 2. In particular, the enqueueing system of the present invention is represented by four RQCBs 40, 42, 44 and 46 in the upper part and two SQCBs 48 and 50 in the lowest part. There is one RQCB per connection to be merged in a single VC.

Assuming that the connections queued in RQCB 40 and RQCB 42 belong to the same class of service, they are each transferred to the same SQCB when the last cell of a packet partially queued (except the last cell) in each RQCB is received. A transfer unit 52, thus transfers the contents of RQCB 42 as soon as the lock bit of the BCB corresponding to the received cell is detected as being set to 0. It must be noted that the BCB corresponding to this last cell is directly queued within the SQCB after the BCBs are transferred from the RQCB without being queued into the latter.

As illustrated in FIG. 3, the transmission of the contents of the SQCBs is managed by a merged VC scheduler 54. Although various criteria can be considered in determining the scheduling rule used by scheduler 54, an absolute priority from the highest to the lowest priority of the classes of service is preferably utilized.

When scheduler 54 has selected a SQCB, it becomes locked by locking unit 56 and responds by dequeueing cells contained in the SQCB until it detects the last cell of the packet that has a lock bit L set to 0. This BCB lock bit L 58 triggers a locking unit 56 which unlocks scheduler 54 that responds by selecting a new SQCB according to its scheduling rule. Such a lock mechanism insures that the cell stream out of scheduler 54 has no packet interleaving while several SQCBs are to be merged in a single VC.

Figure 4:
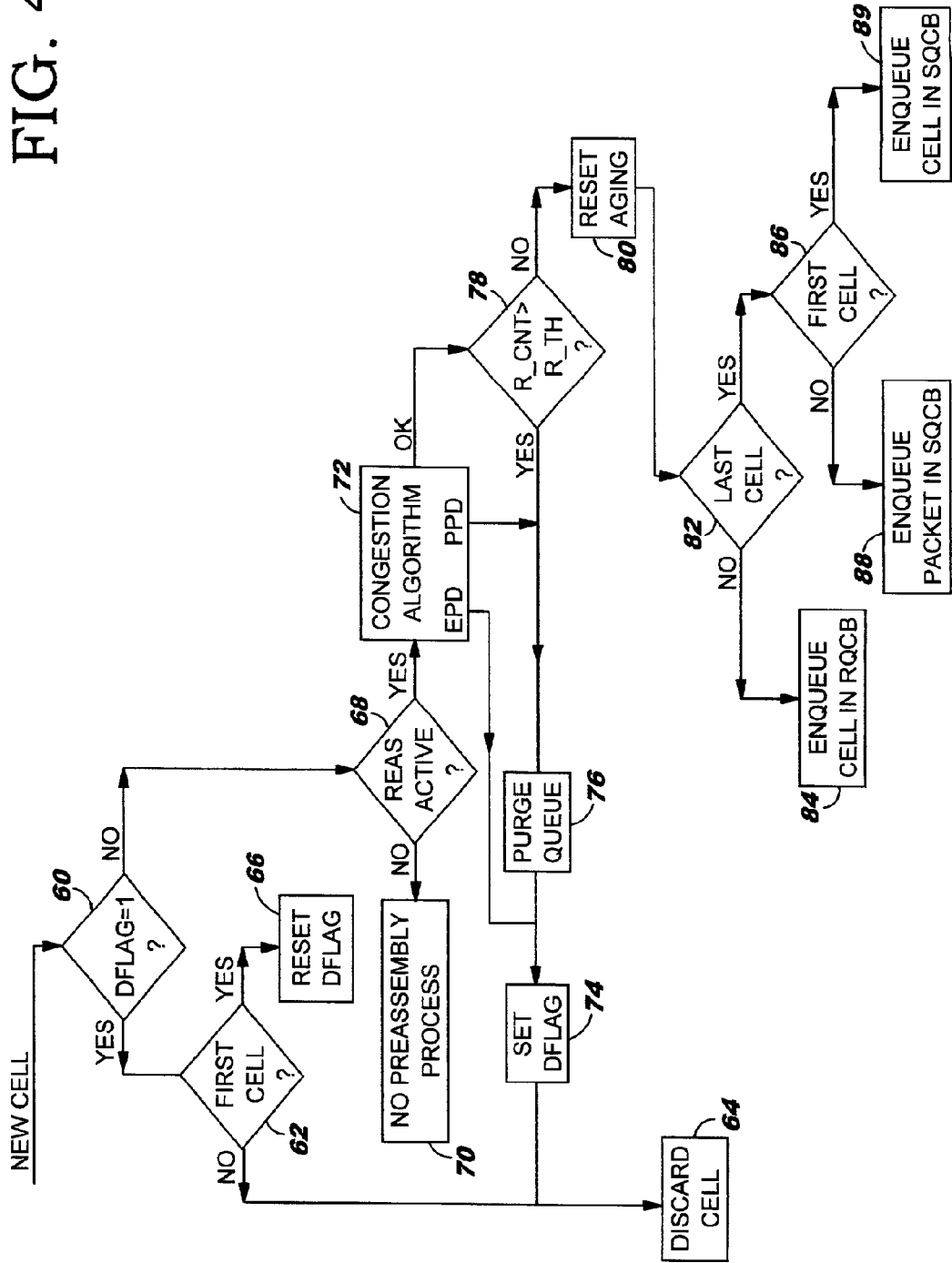
FIG. 4 is a flow diagram depicting a reassembly enqueuing process implemented in accordance with a preferred embodiment of the present invention.

Turning now to FIG. 4, there is illustrated a flow diagram depicting a reassembly enqueuing process implemented in accordance with a preferred embodiment of the present invention. As shown in FIG. 4, when a cell is received, the discard flag in the connection control block is considered (step 60). If the bit is active, a determination is made of whether or not the cell is the first cell for the object packet (step 62). It should be noted that a first cell of a new packet in AAL5 is identified by the fact that the previous cell of the connection was a last cell as indicated by a bit in the ATM cell header. This "previous cell was last" information is kept in memory in the connection control block. If the cell is not the first cell of a new packet, the cell is discarded (step 64).

If the discard flag is active and the cell is a first cell of a new packet, the discard flag is reset (step 66) and the cell is processed as if the discard flag was not active. Next, the reassembly bit in the connection control block is checked (step 68). If the reassembly bit indicates that reassembly is not currently active, no reassembly is processed (step 70).

If reassembly is active, the traffic management and congestion management processes are activated to determine whether the cell can be received or must be discarded. Various congestion algorithms may be used (step 72) in making this determination. These algorithms include the threshold and the queue count of the SQCB indicated in the connection control block as inputs, as well as the count of remaining free buffers. The output of the processed algorithms include the following: EPD or early packet discard condition; PPD or partial packet discard condition; or no discard condition.

In the case of EPD, if the cell is the first cell of a new packet, the discard flag in the connection control block is set (step 74), and the cell is discarded (step 64). If the cell is not a fist cell, the cell is received (OK). In the case of PPD, indicating that the congestion is more severe, the already assembled cells in the RQCB are discarded (the queue is purged) (step 76), the discard flag is set (step 74), and the cell is discarded (step 64). Note that since the PPD discard condition corresponds to a more severe congestion state than EPD, the EPD condition is always met when PPD is met.

It should be noted that splitting the traffic to be merged among several SQCBs that correspond to various classes of service, allows upon cell reception provision of QoS differentiation since the inputs of the congestion algorithm are different. For example, in case of two classes of service, if the highest priority traffic fills all the bandwidth available for the VC, the count of the lowest priority SQCB will increase until all incoming cells of the lowest priority are discarded. Thus, high priority traffic is not impacted by low priority traffic.

If the cell may be received under current target queue congestion levels, the count of assembled cells in the RQCB is compared to the RQCB threshold (step 78). If the threshold corresponding to the maximum allowed size of a packet is exceeded, the already assembled cells in the RQCB are discarded (step 76), the discard flag is set (step 74), and the cell is discarded (step 64). If the cell may be received under current congestion levels and also with regard to maximum allowable packet size, an aging bit in the RQCB is reset (step 80).

A check is made to determine whether or not the cell is the last cell for the object packet (step 82). If the cell is a not the last cell of the packet, the cell is enqueued in the RQCB (step 84). This enqueueing is achieved by chaining the current tail of the RQCB to the buffer of the received cell utilizing the next buffer address field in the BCB of the current tail (updating the RQCB count and updating the RQCB tail).

If the cell is the last cell of the packet and it is also determined that it is not the first cell of the packet (step 86), the already assembled cells in the RQCB together with the received last cell are enqueued in a single operation in the SQCB contained within the connection control block (step 88). To achieve this enqueueing, first, the tail of the SQCB is chained to the head of the partially assembled packet in RQCB. Next, the tail of the partially assembled packet in RQCB is chained to the new buffer address. The count in the SQCB is incremented with the cell count of the partially assembled packet in RQCB plus one. Finally, the tail of the SQCB is updated. If the cell is also the first cell of a packet, it is enqueued in the SQCB (step 89) (the tail of the SQCB is chained to the new buffer address and the count in the SQCB is incremented by one).

The result of the last operation (step 88 or 89) is compared to a classical operation consisting of first queuing the last cell of the packet in the RQCB. Next, the completely assembled packet is moved into the SQCB wherein it resides while the following steps are performed. First, the current tail of the RQCB is chained to the buffer of the received cell using the NBA information field in the BCB of the current tail. Next, the RQCB count and the RQCB tail are updated. The tail of the SQCB is then chained to the head of the totally assembled packet in the RQCB. The count in the SQCB is incremented with the cell count of the partially assembled packet in RQCB. Finally, the tail of the SQCB is updated.

In accordance with a preferred embodiment of the present invention, an aging mechanism is provided as a feature of the enqueuing apparatus described with reference to FIGS. 2, 3, and 4. The object of the aging mechanism is to detect a condition in which a connection that includes a packet that is currently being assembled becomes inactive. In such a case, the buffer locations containing the cells pointed by the RQCB must be released to the free buffer queue. Such an aging mechanism periodically scans all the queues (RQCBs). The scanning period is programmable in a wait timer that has a one second default value.

Figure 5:
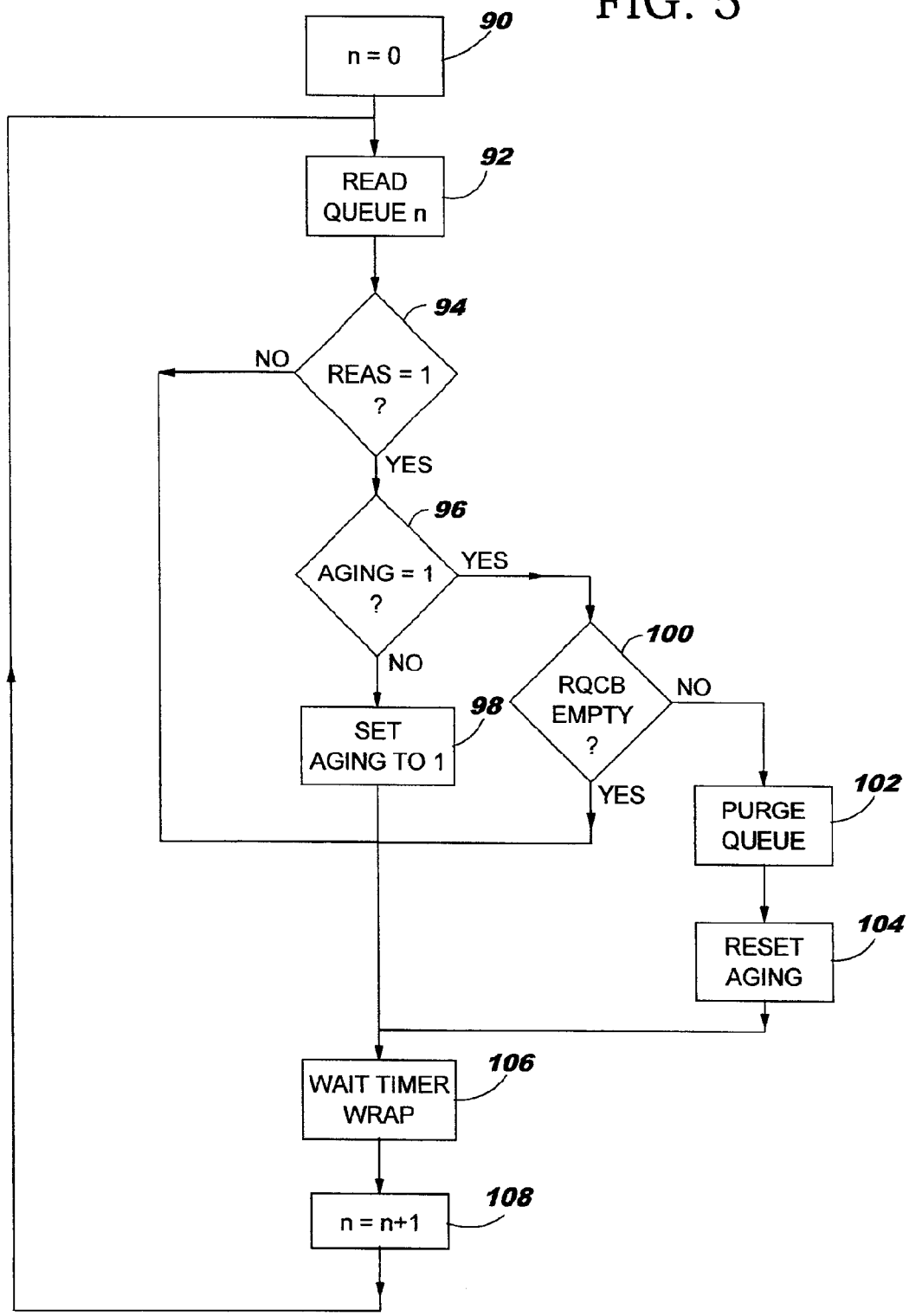
FIG. 5 is a flow diagram illustrating implementation of an aging mechanism in accordance with a preferred embodiment of the present invention.

With reference now to FIG. 5, there is depicted a flow diagram illustrating implementation of an aging mechanism in accordance with a preferred embodiment of the present invention. The process begins with an initialization of an aging queue n to n=0 (step 90). Queue n is then read (step 92) to determine whether or not the reassembly process is active, that is whether the queue is RQCB (rather than SQCB) and the REAS bit is set to 1 in the RQCB (step 94). If it is determined that the reassembly process is active, it is determined whether AGING bit is set to 1 in the RQCB (step 96). If not, the AGING bit is set to 1 (step 98). If the AGING bit was already set to 1, a determination is made of whether or not the RQCB is empty (step 100). A determination that the RQCB is not empty indicates that no cell has been received on the connection since the previous time at which the RQCB was processed since any cell received in the queue resets the AGING bit to 0 (see FIG. 4). Such a condition is interpreted as a failure. Therefore, the RQCB is purged (step 102) and the AGING bit is reset (step 104).

If it is determined that the REAS bit of the RQCB is not set to 1, or that the AGING bit is not set to 1, or that the RQCB is empty, or that the RQCB is not empty and the AGING bit has been reset, the process waits for the wrapping of the wait timer (step 106) and n is incremented to n+1 (step 108) before looping back to the beginning of the process at (step 92) wherein the queue is read.

While the invention has been particularly shown and described with reference to a preferred embodiment, it will be understood by those skilled in the art that various changes in form and detail may be made therein without departing from the spirit and scope of the invention.

What is claimed is:

1. A system for merging a plurality of connections that share a same class of service into a single virtual circuit (VC) connecting a first switching node to a second switching node in an Asynchronous Transfer Mode (ATM) network, said system comprising:

a data buffer for storing cells that constitute a packet received by a switching node;

a queuing apparatus comprising:

a plurality of connection queues associated respectively with each of said plurality of connections; and a scheduled queue corresponding to a particular class of service, wherein contents of said plurality of connection queues are transferred into said scheduled queue before being transmitted on said VC;

a reassembly queue control block (RQCB) associated with each of said plurality of connection queues, wherein said RQCB defines a chain of buffer control blocks, wherein each buffer control block corresponds to a cell belonging to a packet transmitted in a particular connection, and wherein said buffer control block includes a next buffer address in said data buffer and a lock bit that is normally set to 1 for an incoming cell and is set to 0 for an incoming cell only if said incoming cell is a last cell of said packet; and a scheduled queue control block (SQCB) associated with said scheduled queue to which said chain of buffer control blocks is transferred in response to a determination that said lock bit of a cell stored within said data buffer ms set to 0, wherein a corresponding buffer control block is chained to said chain of buffer control blocks in said SQCB without having been previously queued in said RQCB; and an aging mechanism that is periodically activated for discarding cells that are currently engueued in a queue associated with said RQCB in response to no cell having been enqueued in said RQCB during a predetermined period of time.

2. The system of claim 1, wherein said plurality of connections includes several sets of connections wherein each set of connections is associated with different classes of service, and further comprising a merged VC scheduler for scheduling a transmission of cells from said scheduled queues that are respectively associated with alternate SQCBs in accordance with said different classes of service.

3. The system of claim 2, wherein said merged VC scheduler includes processing means for scheduling cell transmission based upon a priority order of said different classes of service.

4. The system of claim 3, further comprising locking means for locking cell transmission from a scheduled queue associated with a SQCB until said scheduled queue has received a last cell of an entire packet.

5. The system of claim 4, wherein said locking means unlocks said merged VC scheduler in response to a lock bit of a buffer control block that corresponds to a cell to be transmitted is set to 0.

6. The system of claim 1, wherein said RQCB further includes an aging bit, wherein said aging bit being automatically set to 0 in response to a first cell being enqueued in said RQCB.

7. The system of claim 6, further comprising:

processing means for periodically activating said aging mechanism being to discard cells enqueued in said RQCB in response to said aging bit being set to 1; and processing means for setting said aging bit to 1 in response to said aging bit being previously set to 0.

8. The system of claim 1, further comprising a connection control block is associated with each connection to be merged within said VC, wherein said connection control block includes an address of a RQCB utilized to assemble packets corresponding to said connection.

9. The system of claim 8, wherein said connection control block further comprises processing means for enqueueing cells corresponding to said RQCB in accordance with an address of a SQCB associated with said connection.

10. The system of claim 8, wherein said connection control block further includes a discard flag bit for indicating that a packet in progress is being discarded.

11. The system of claim 10, further comprising an early packet discard processing means for setting said discard flag bit in said connection control block in response to activation of said connection control block and for discarding cells of an incoming packet in response to said early packet discard means being activated prior to said connection control block receiving a first cell of said incoming packet.

12. The system of claim 10, further comprising a partial packet discard processing means for setting said discard flag bit in response to activation of said connection control block, and for purging said RQCB by deleting the presently enqueued and following cells of an incoming packet.

* * * * *